United States Patent
Jeong

(10) Patent No.: US 8,509,301 B2
(45) Date of Patent: Aug. 13, 2013

(54) AUDIO AND VIDEO SYNCHRONIZING METHOD IN TRANSCODING SYSTEM

(75) Inventor: Nam Hun Jeong, Seoul (KR)

(73) Assignee: Media Excel Korea Co. Ltd., Seoul (KR)

( * ) Notice: Subject to any disclaimer, the term of this patent is extended or adjusted under 35 U.S.C. 154(b) by 213 days.

(21) Appl. No.: 13/074,238

(22) Filed: Mar. 29, 2011

(65) Prior Publication Data

US 2012/0207225 A1  Aug. 16, 2012

(30) Foreign Application Priority Data

Feb. 10, 2011  (KR) .................. 10-2011-0011928

(51) Int. Cl.
*H04B 1/66*  (2006.01)

(52) U.S. Cl.
USPC .................................... 375/240.01

(58) Field of Classification Search
USPC .................................................. 375/240
See application file for complete search history.

(56) References Cited

U.S. PATENT DOCUMENTS

| | | | |
|---|---|---|---|
| 7,471,337 B2 * | 12/2008 | Wells et al. ................ | 348/515 |
| 2010/0070608 A1 * | 3/2010 | Hosur .......................... | 709/218 |
| 2011/0002399 A1 * | 1/2011 | Raveendran ............ | 375/240.28 |

* cited by examiner

*Primary Examiner* — David Czekaj
*Assistant Examiner* — Tsion B Owens
(74) *Attorney, Agent, or Firm* — Ladas & Parry LLP

(57) ABSTRACT

Provided is an audio and video synchronizing method in a transcoding system, which compensates for lossy audio frames and lossy video frames according to a relative time at an early encoding stage, corrects a jitter of audio frames and readjusts a jitter of video frames in order to correspond to the audio frames having the corrected jitter at a multiplexing stage that is a later encoding stage, thereby minimizing a variation of the duration of the video frames and preventing audio and video from being unsynchronized when a media file is reproduced.

11 Claims, 5 Drawing Sheets

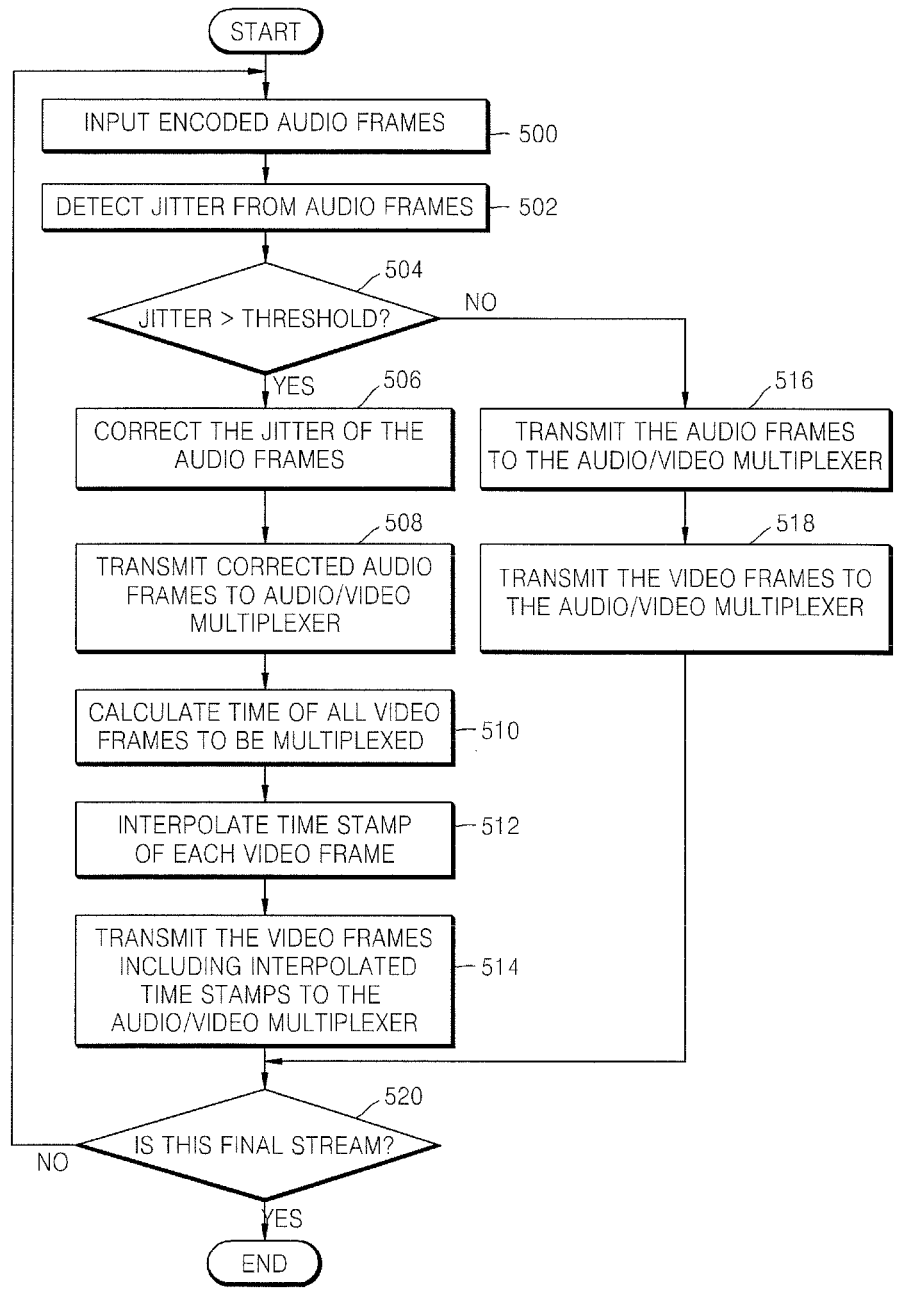

AUDIO AND VIDEO SYNCHRONIZING METHOD IN TRANSCODING SYSTEM

CROSS-REFERENCE TO RELATED PATENT APPLICATION

This application claims the benefit of Korean Patent Application No. 2011-0011928, filed on Feb. 10, 2011, in the Korean Intellectual Property Office, the disclosure of which is incorporated herein in its entirety by reference.

BACKGROUND

The invention relates to transcoding, and more particularly, to an audio and video synchronizing method in a transcoding system.

In general, transcoding is a core technology for supporting and solving a ubiquitous computing environment across any network, any device, and any content by outputting a single piece of content through various networks and terminals.

Recently, an MP4 file format (MPEG-4 Part 14) is being widely used owing to portable media reproducers, for example, cellular phones, smart phones, MP3 players, etc. The MP4 file format (MPEG-4 Part 14) was created on the basis of Apple's QuickTime container format, and is widely used in formats of MP4, 3GPP, etc. according to applications.

General media files or streams consist of video of more than one track and audio of more than one track. Each piece of video and audio includes time information for exact synchronization when reproduced. When media that is synchronized with audio and video is generally converted into a different format of a container, audio and video are often unsynchronized due to two factors. First, long-term jitter may occur during conversion of time information. Second, packet loss may occur during a stream input.

When media in which loss does not occur is converted into a different container, audio and video must be synchronized theoretically. However, each container uses a time information storage method. A difference in an expression of time causes low amount of jitter. When pre-processing such as a frame rate conversion or a sampling rate conversion is performed, additional jitter may occur. If a long time file is converted without compensating for the jitter, the more the reproduction time increases, the more the audio and video are unsynchronized.

SUMMARY

Various embodiments of the invention provide an audio and video synchronizing method in a transcoding system that minimizes a variation in a duration of a video frame and allows a duration of an audio frame to have a fixed value, and thus non-synchronization of audio and video does not occur when a media file is reproduced for a long period of time.

According to an embodiment of the invention, there is provided an audio and video synchronizing method in a transcoding system including: receiving data including encoded audio frames and encoded video frames; de-multiplexing the data to obtain audio frames and video frames; decoding the audio frames and the video frames; detecting lossy frames of the decoded audio frames and the decoded video frames by using audio time stamp information included in the decoded audio frames and video time stamp information included in the decoded video frames; compensating for the lossy frames by comparing relative times of the lossy audio frames and the lossy video frames; encoding the compensated audio frames and the compensated video frames; and multiplexing the encoded audio frames and the encoded video frames.

The compensating for the lossy frames may include: if the lossy audio frames are greater than the lossy video frames, inserting as many mutes as lengths of the video frames corresponding to the lossy audio frames into the lossy audio frames.

The method may further include: filtering a start part or an end part of the lossy audio frames into which the mutes are inserted.

The compensating for the lossy frames may include: if the lossy video frames are greater than the lossy audio frames, calculating a number of the video frames corresponding to lengths of the lossy audio frames; and duplicating as many video frames right before a loss occurs as the calculated number of the video frames to compensate for the lossy video frames.

The multiplexing may include: correcting jitter of the encoded audio frames.

The correcting may include: correcting a duration of the video frames corresponding to the audio frames having the corrected jitter.

The correcting may include: multiplexing previous video frames of the video frames corresponding to the audio frames having the corrected jitter; calculating time of the video frames that include the video frames corresponding to the audio frames having the corrected jitter and that are to be multiplexed; interpolating time stamps of the video frames to be multiplexed based on the calculated time; and multiplexing the video frames to be multiplexed by using the interpolated time stamps.

The data may be a file format including one of an MP4 file, an audio video interleave (AVI) file, a transport stream (TS) file, and a 3GP file, or may be a transfer stream.

According to another embodiment of the invention, there is provided a transcoding system including: a de-multiplexer for receiving data including encoded audio frames and encoded video frames, and de-multiplexing the data to audio frames and video frames; a decoding unit including an audio decoder for decoding the audio frames and a video decoder for decoding the video frames; a lossy frame compensation unit for detecting lossy frames of the decoded audio frames and the decoded video frames by using audio time stamp information included in the decoded audio frames and video time stamp information included in the decoded video frames, and compensating for the lossy frames by comparing relative times of the lossy audio frames and the lossy video frames; an encoding unit including an audio encoder for encoding the compensated audio frames and a video encoder for encoding the compensated video frames; and a multiplexing unit for multiplexing the encoded audio frames and the encoded video frames.

The lossy frame compensation unit may include: a lossy frame detection unit for detecting lossy frames of the decoded audio frames and the decoded video frames by using audio time stamp information included in the decoded audio frames and video time stamp information included in the decoded video frames; an audio mute insertion unit for, if the lossy audio frames are greater than the lossy video frames, inserting as many mutes as lengths of the video frames corresponding to the lossy audio frames into the lossy audio frames; and a video frame duplication unit for, if the lossy video frames are greater than the lossy audio frames, calculating a number of the video frames corresponding to lengths of the lossy audio frames, and duplicating as many video frames right before a loss occurs as the calculated number of the video frames to compensate for the lossy video frames.

The multiplexing unit may correct a jitter of the encoded audio frames.

The multiplexing unit may correct a duration of the video frames corresponding to the audio frames having the corrected jitter.

The multiplexing unit may include: a frame buffer including a video frame buffer for buffering the encoded video frames and an audio frame buffer for buffering the encoded audio frames; an audio jitter correction unit for correcting a jitter of the audio frames output by the audio frame buffer; a time stamp interpolation unit for calculating times of the video frames that include the video frames corresponding to the audio frames having the corrected jitter and are to be multiplexed, and interpolating time stamps of the video frames to be multiplexed based on the calculated times with respect to the video frames output by the video frame buffer; and an audio and video multiplexing unit for multiplexing the encoded video frames to be multiplexed by using the audio frames having the corrected jitter and the interpolated time stamps.

According to another embodiment of the invention, there is provided a non-transitory computer readable recording medium storing a program for executing the audio and video synchronizing method in a transcoding system.

BRIEF DESCRIPTION OF THE DRAWINGS

The above and other features and advantages of the invention will become more apparent by describing in detail exemplary embodiments thereof with reference to the attached drawings in which:

FIG. 5 is a flowchart of an audio and video synchronizing method according to an embodiment of the invention.

DETAILED DESCRIPTION

Embodiments of the invention will be described below in more detail with reference to the accompanying drawings. In the description of the invention, certain detailed explanations of related art are omitted when it is deemed that they may unnecessarily obscure the essence of the invention.

The terms used in the present specification are merely used to describe particular embodiments, and are not intended to limit the invention. All terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
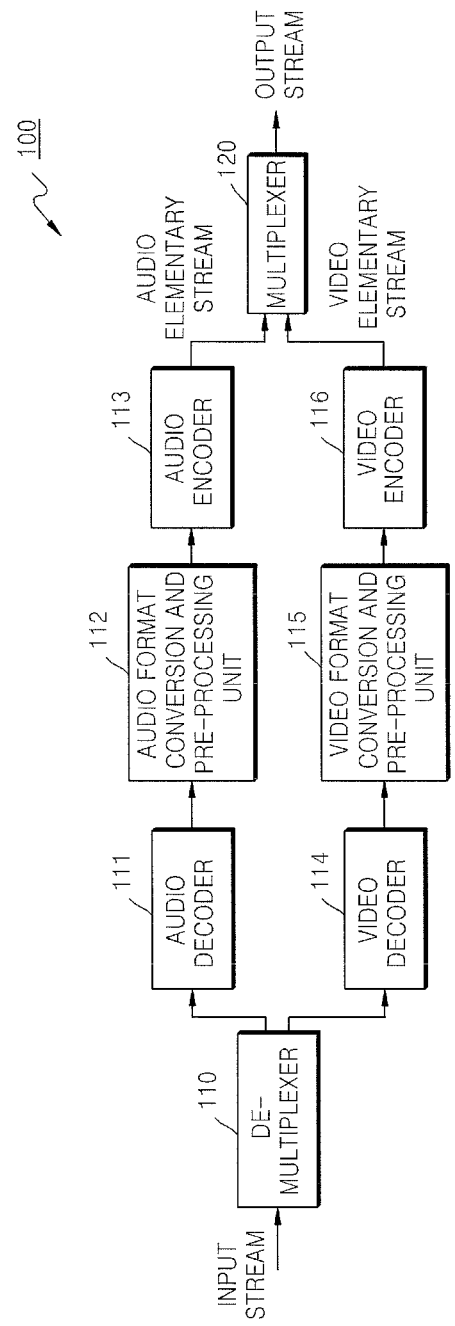
FIG. 1 is a block diagram of a transcoding system according to an embodiment of the invention.

FIG. 1 is a block diagram of a transcoding system 100 according to an embodiment of the invention. Referring to FIG. 1, the transcoding system 100 is able to convert input media into another format of output media. The transcoding system 100 can process a multi format input to a multi format output. In this regard, an input source includes a media file of various audio and video formats input from an IP network, a digital video broadcasting asynchronized serial interface (DVB-ASI), and a serial digital interface (SDI).

The transcoding system 100 includes a de-multiplexer 110, an audio decoder 111, an audio format conversion and preprocessing unit 112, an audio encoder 113, a video decoder 114, a video format conversion and pre-processing unit 115, a video encoder 116, and a multiplexer 120. In this regard, although the transcoding system 100 includes all the elements described above, the invention is not limited thereto. The transcoding system 100 may not include some of the elements or may further include other additional elements.

The transcoding system 100 receives MPEG-2 streams over a network and generates an output stream. The received MPEG-2 streams are decoded to generate audio data and video data. For example, the received MPEG-2 streams are decoded as pulse-code modulation (PCM) data and RAW data in a YUV data format. Uncompressed RAW data is encoded in a target format through format conversion and pre-processing operations. Encoded audio and video elementary streams are multiplexed in a system format according to a system construction and are output or are stored as a file.

The demultiplexer 110 demultiplexes the received MPEG-2 streams to obtain audio elementary streams and video elementary streams and outputs the audio elementary streams and the video elementary streams to the audio decoder 111 and the video decoder 114. In this regard, the received MPEG-2 streams include audio streams and video streams and may include a file format including an MPEG-2 transfer stream through an IP network, an MPEG-2 transfer stream through an asynchronous serial interface (ASI), an real time streaming protocol (RTSP) stream, a serial digital interface (SDI) input, MP4, audio video interleave (AVI), transport stream (TS), and 3GP.

The audio decoder 111 decodes the audio elementary streams transmitted from the demultiplexer 110 and generates uncompressed audio data. The audio decoder 111 may include, for example, advanced audio coding (AAC), AAC+, MPEG-1 Layer 1, 2, 3, and AC-3. The video decoder 114 decodes the video elementary streams transmitted from the demultiplexer 110 and generates uncompressed video data. The video decoder 114 may include, for example, H.263, MPEG-2, MPEG-4, and H.264.

The audio format conversion and pre-processing unit 112 and the video format conversion and pre-processing unit 115 convert the uncompressed audio data and video data into audio data and video data in the target format, and perform pre-processing for encoding at a next encoding end.

The audio encoder 113 codes the converted audio data transmitted from the audio format conversion and pre-processing unit 112 and outputs the audio elementary streams. The audio encoder 113 may include, for example, AAC, ACC+, MPEG-1 Layer 1, 2, 3, and AC-3. The video encoder 116 codes the converted video data transmitted from the video format conversion and pre-processing unit 115 and outputs the video elementary streams. The video encoder 116 may include, for example, H.263, MPEG-2, MPEG-4, and H.264.

The multiplexer 120 transmits the coded audio elementary streams and the coded video elementary streams through a communication channel or combines the coded audio elementary streams and the coded video elementary streams to be stored as a file. In this regard, the multiplexer 120 may include various multiplexing functional blocks according to various transmission shapes or various storage file shapes.

Figure 2:
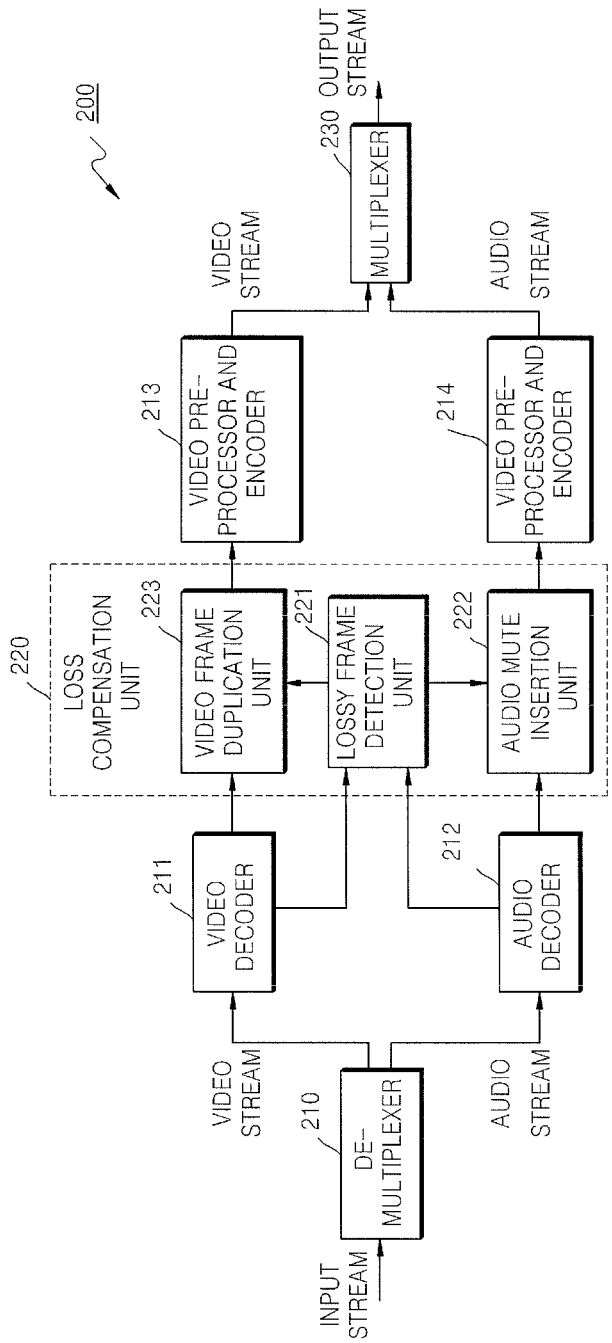
FIG. 2 is a block diagram of a transcoding system according to another embodiment of the invention.

FIG. 2 is a block diagram of a transcoding system 200 according to another embodiment of the invention.

Referring to FIG. 2, the transcoding system 200 includes a de-multiplexer 210, a video decoder 211, an audio decoder 212, a loss compensation unit 220, a video pre-processor and encoder 213, an audio pre-processor and encoder 214, and a multiplexer 230. The loss compensation unit 220 includes a lossy frame detection unit 221, an audio mute insertion unit 222, and a video frame duplication unit 223.

The transcoding system 200 detects a lossy portion before an encoding operation is performed, compares a relative time of a lossy video frame and a relative time of a lossy audio frame, and performs compensation processing. After the encoding operation is performed, that is, when a multiplexing operation is performed, a duration jitter of an audio frame is extracted, and a duration of a video frame is readjusted by using the duration jitter of the audio frame, which minimizes a variation in the duration of the video frame and allows the duration of the audio frame to have a fixed value, and thus non-synchronization of audio and video files does not occur when the audio file and the video file are reproduced for a long period of time.

The de-multiplexer 210 receives data including encoded audio frames and encoded video frames and de-multiplexes the data to obtain audio frames and video frames. In this regard, the data may be an MP4 file format, an AVI file format, a TS file format, or a 3GP file format, or may be a transfer stream including an MPEG-2 transfer stream through an IP network, an MPEG-2 transfer stream through an ASI, an RTSP stream, or an SDI input stream.

The video decoder 211 decodes the video streams transmitted from the de-multiplexer 210, transmits the decoded video frames to the frame duplication unit 223, and transmits time stamp information included in the video streams to the lossy frame detection unit 221.

The audio decoder 212 decodes the audio stream transmitted from the de-multiplexer 210, transmits the decoded audio frames to the audio mute insertion unit 222, and transmits time stamp information included in the audio streams to the lossy frame detection unit 221.

The lossy frame detection unit 221 determines whether a loss occurs in each of the audio frames and the video frames by using the transmitted time stamp information of the video frames and the transmitted time stamp information of the audio frames.

The audio mute insertion unit 222 inserts as many mutes as video durations during a loss period into lossy audio frames in order to compensate for the lossy audio frames.

The video frame duplication unit 223 calculates a number of video frames closest to lengths of audio frames corresponding to lossy video frames and duplicates as many video frames right before the loss occurs as the calculated number of the video frames in order to compensate for the lossy video frames.

The lossy frame detection unit 221 compares a relative time of the lossy video frames and a relative time of the lossy audio frames and performs appropriate compensation. In more detail, if the lossy audio frames are greater than the lossy video frames, the lossy frame detection unit 221 controls the audio mute insertion unit 222 to insert as many mutes as lengths of the video frames corresponding to the lossy audio frames into the lossy audio frames. The lossy frame detection unit 221 may control the audio mute insertion unit 222 to additionally perform filtering on portions where a mute starts and ends in order to minimize a distortion of sound due to the insertion of the mute. In this regard, the filtering includes low pass filtering, linear interpolation or bilinear interpolation.

If the lossy video frames are greater than the lossy audio frames, the lossy frame detection unit 221 controls the video frame duplication unit 223 to calculate a number of video frames corresponding to the lossy video frames and duplicate as many video frames right before the loss occurs as the calculated number of the video frames to the lossy video frames.

The video pre-processor and encoder 213 and the audio pre-processor and encoder 214 encode the compensated audio frames and the compensated video frames, respectively, and transmit the video streams and the audio streams to the multiplexer 230.

The multiplexer 230 multiplexes the audio frames and the video frames into a single stream. In this regard, when a jitter of the encoded audio frame is corrected, a duration of a video frame corresponding to the audio frame having the corrected jitter is corrected.

Audio and video are synchronized in the transcoding system according to an embodiment of the invention by compensating for lossy audio frames or lossy video frames at an early encoding stage and removing a jitter included in audio frames at a later encoding stage, i.e. a multiplexing step. During synchronization of audio and video, a duration of video frames is corrected, and a sequence of the video frames is not changed in order to remove a jitter included in the audio and maintain synchronization of the audio and video.

Figure 3:
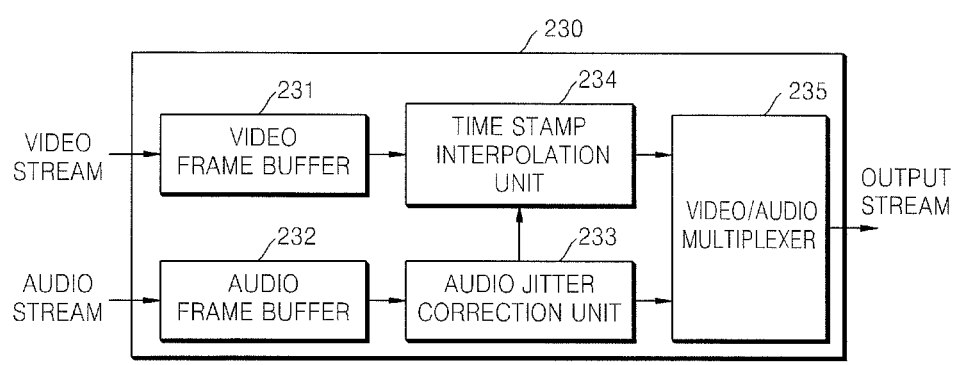
FIG. 3 is a block diagram of a multiplexer of FIG. 2 according to an embodiment of the invention.

FIG. 3 is a block diagram of the multiplexer 230 of FIG. 2 according to an embodiment of the invention.

Referring to FIG. 3, the multiplexer 230 includes a video frame buffer 231, an audio frame buffer 232, an audio jitter correction unit 233, a time stamp interpolation unit 234, and a video/audio multiplexer 235.

The video frame buffer 231 and the audio frame buffer 232 buffer encoded video frames and encoded audio frames, respectively.

The audio jitter correction unit 233 corrects a jitter present in the audio frames output by the audio frame buffer 232. In this regard, the jitter means a time displacement from a reference point, and is a value indicating how fast or slow a signal appears from the reference point. In general, each container uses a separate time information storage method, and causes a low amount of jitter when a difference in a time expression method changes. A pre-processing operation such as frame rate conversion or sampling rate conversion may cause additional jitter. If a longtime file is converted without compensating for the jitter, the reproduction time further increases, and the non-synchronization of audio and video further occurs. In the present embodiment, to prevent the audio and video from being unsynchronized, the jitter present in the audio frames is corrected at the multiplexing stage that is a later stage after format conversion and pre-processing operations are performed.

The time stamp interpolation unit 234 receives information regarding the jitter present in the audio frames being corrected from the audio jitter correction unit 233. The time stamp interpolation unit 234 calculates video frame duration that correspond to the audio frames having the corrected jitter and that are to be multiplexed with respect to the video frames output by the video frame buffer 231, and interpolates time stamps of the video frames that are to be multiplexed based on the calculated time. This is to prevent a sequence of the video frames from being changed by correcting a duration of the video frames in order to maintain synchronization of audio and video after removing a jitter included in audio.

The video and audio multiplexer 235 multiplexes input audio frames and video frames to a single stream, and multiplexes the encoded video frames by using the audio frames having the corrected jitter transmitted from the audio jitter correction unit 233 and the time stamps interpolated by the time stamp interpolation unit 234.

Figure 4:
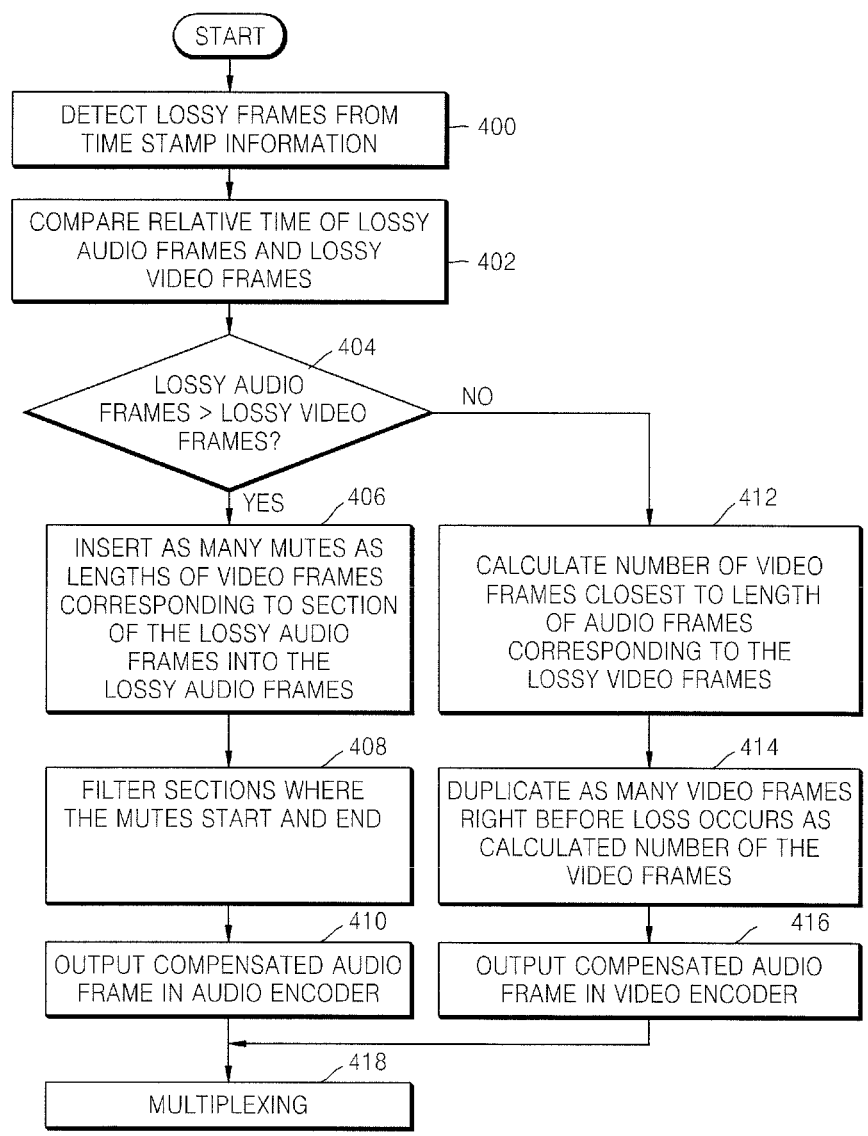
FIG. 4 is a flowchart of an audio and video synchronizing method according to an embodiment of the invention.

FIG. 4 is a flowchart of an audio and video synchronizing method according to an embodiment of the invention.

Referring to FIG. 4, in operation 400, lossy frames are detected from time stamp information. In this regard, time stamp information included in each of decoded audio frames and decoded video frames is used.

In operation 402, relative times of lossy audio frames and lossy video frames are compared. In operation 404, it is determined whether the lossy audio frames are greater than the lossy video frames. If it is determined that the lossy audio frames are greater than the lossy video frames, in operation 406, as many mutes as lengths of video frames corresponding to a section of the lossy audio frames are inserted into the lossy audio frames. That is, if a loss of the audio frames is greater than that of the video frames, as many mutes as video durations during a lossy period are added.

In operation 408, sections where the mutes start and end are filtered.

In operation 410, a compensated audio frame is output to an audio encoder.

If it is determined that the lossy video frames are greater than the lossy audio frames, in operation 412, a number of the video frames closest to lengths of the audio frames corresponding to the lossy video frames is calculated.

In operation 414, as many of the video frames right before a loss occurs as the calculated number of the video frames are duplicated to the lossy video frames. In this regard, when a process subordinate to a frame rate such as bitrate control is not performed, an adjustment of video duration at a multiplexer stage compensates for a large video loss, whereas, when the bitrate control is performed, since a bitrate varies according to the number of the video frames per unit time, the exact number of frames are repeated in order to perform exact bitrate control.

In operation 416, a compensated video frame is output to a video encoder.

In operation 418, the lossy frames are compensated for, and encoded audio frames and encoded video frames are multiplexed to a single stream.

FIG. 5 is a flowchart of an audio and video synchronizing method according to an embodiment of the invention.

Referring to FIG. 5, in operation 500, encoded audio frames are input.

In operation 502, jitter is detected from the input audio frames.

In operation 504, it is determined whether the jitter is greater than a threshold value. If it is determined that the jitter is greater than the threshold value, in operation 506, the jitter present in the audio frames is corrected.

In operation 508, the audio frames having the corrected jitter are transmitted to an audio/video multiplexer.

In operation 510, a time taken for all video frames to be multiplexed is calculated.

In operation 512, a time stamp of each of the video frames is interpolated. In this regard, interpolation may be linear interpolation. That is, a section of the video frames to be multiplexed is readjusted in order to reflect the corrected jitter of the audio frames on the video frames.

In operation 514, the video frames including the interpolated time stamps are transmitted to an audio/video multiplexer.

If it is determined that the jitter is smaller than the threshold value, in operation 516, the audio frames are transmitted to the audio/video multiplexer.

In operation 518, the video frames are transmitted to the audio/video multiplexer.

In operation 520, it is determined whether a frame is final. If it is determined that the frame is not final, operation 500 is performed.

The audio and video synchronizing method in a multiplexing stage described with reference to FIG. 5 removes jitter from audio time information in order to maintain synchronization of audio and video in a reproduction device. In this regard, the duration of video frames is corrected in order to maintain synchronization of the audio and video while removing audio jitter. In more detail, audio frames are transmitted to a multiplexer at a determined time interval, i.e. every one second. At this time, the duration of the audio frames is constant. If the jitter exceeds a threshold within the time interval, corresponding audio frames are transmitted to the multiplexer. All video frames previous to the multiplexed audio frames are transmitted to the multiplexer. If the audio jitter exceeds the threshold during the time taken for all video frames to be multiplexed is calculated again, and a time stamp of each frame is linearly interpolated. If the audio jitter does not exceed the threshold, the video frames are multiplexed according to original time stamps.

As described above, in the embodiments of the invention, an audio and video synchronizing method in a transcoding system minimizes a variation of a duration of a video frame and allows a duration of an audio frame to have a fixed value, and thus non-synchronization of audio and video does not occur when a media file is reproduced for a long period of time.

The device described herein may comprise a processor for executing program data, a memory for storing the program data, a permanent storage such as a disk drive, a communications port for handling communications with external devices, and user interface devices, including a display, keys, etc. When software modules are involved, these software modules may be stored as program instructions or computer readable codes executable on the processor on a computer-readable media such as read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. This media can be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that are executed in one or more processors. Furthermore, the invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention.

While the invention has been particularly shown and described with reference to exemplary embodiments thereof, it will be understood by those of ordinary skill in the art that various changes in form and details may be made therein without departing from the spirit and scope of the invention as defined by the following claims.

What is claimed is:

1. An audio and video synchronizing method in a transcoding system comprising:
   receiving data including encoded audio frames and encoded video frames;
   de-multiplexing the data to obtain audio frames and video frames;
   decoding the audio frames and the video frames;
   detecting lossy frames of the decoded audio frames and the decoded video frames by using audio time stamp information included in the decoded audio frames and video time stamp information included in the decoded video frames;
   compensating for the lossy frames by comparing relative times of the lossy audio frames and the lossy video frames;
   encoding the compensated audio frames and the compensated video frames; and
   multiplexing the encoded audio frames and the encoded video frames,
   wherein the compensating for the lossy frames comprises:
      if the lossy audio frames are greater than the lossy video frames, inserting as many mutes as lengths of the video frames corresponding to the lossy audio frames into the lossy audio frames,
   if the lossy video frames are greater than the lossy audio frames,
   calculating a number of the video frames corresponding to lengths of the lossy audio frames; and
   duplicating as many video frames right before a loss occurs as the calculated number of the video frames to compensate for the lossy video frames.

2. The method of claim 1, further comprising:
   filtering a start part or an end part of the lossy audio frames into which the mutes are inserted.

3. The method of claim 1, wherein the multiplexing comprises:
   correcting jitter of the encoded audio frames.

4. The method of claim 3, wherein the correcting comprises:
   correcting a duration of the video frames corresponding to the audio frames having the corrected jitter.

5. The method of claim 3, wherein the correcting comprises:
   multiplexing previous video frames of the video frames corresponding to the audio frames having the corrected jitter;
   calculating time of the video frames that include the video frames corresponding to the audio frames having the corrected jitter and that are to be multiplexed;
   interpolating time stamps of the video frames to be multiplexed based on the calculated time; and
   multiplexing the video frames to be multiplexed by using the interpolated time stamps.

6. The method of claim 1, wherein the data is a file format comprising one of an MP4 file, an audio video interleave (AVI) file, a transport stream (TS) file, and a 3GP file, or is a transfer stream.

7. A non-transitory computer readable recording medium storing a program for executing the method of claim 1.

8. A transcoding system comprising:
   a de-multiplexer for receiving data including encoded audio frames and encoded video frames, and de-multiplexing the data to audio frames and video frames;
   a decoding unit comprising an audio decoder for decoding the audio frames and a video decoder for decoding the video frames;
   a lossy frame compensation unit for detecting lossy frames of the decoded audio frames and the decoded video frames by using audio time stamp information included in the decoded audio frames and video time stamp information included in the decoded video frames, and compensating for the lossy frames by comparing relative times of the lossy audio frames and the lossy video frames;

an encoding unit comprising an audio encoder for encoding the compensated audio frames and a video encoder for encoding the compensated video frames; and a multiplexing unit for multiplexing the encoded audio frames and the encoded video frames, wherein the lossy frame compensation unit comprises:

a lossy frame detection unit for detecting lossy frames of the decoded audio frames and the decoded video frames by using audio time stamp information included in the decoded audio frames and video time stamp information included in the decoded video frames;

an audio mute insertion unit for, if the lossy audio frames are greater than the lossy video frames, inserting as many mutes as lengths of the video frames corresponding to the lossy audio frames into the lossy audio frames; and a video frame duplication unit for, if the lossy video frames are greater than the lossy audio frames, calculating a number of the video frames corresponding to lengths of the lossy audio frames, and duplicating as many video frames right before a loss occurs as the calculated number of the video frames to compensate for the lossy video frames.

9. The transcoding system of claim 8, wherein the multiplexing unit corrects a jitter of the encoded audio frames.

10. The transcoding system of claim 9, wherein the multiplexing unit corrects a duration of the video frames corresponding to the audio frames having the corrected jitter.

11. The transcoding system of claim 9, wherein the multiplexing unit comprises:

a frame buffer comprising a video frame buffer for buffering the encoded video frames and an audio frame buffer for buffering the encoded audio frames;

an audio jitter correction unit for correcting a jitter of the audio frames output by the audio frame buffer;

a time stamp interpolation unit for calculating times of the video frames that include the video frames corresponding to the audio frames having the corrected jitter and are to be multiplexed, and interpolating time stamps of the video frames to be multiplexed based on the calculated times with respect to the video frames output by the video frame buffer; and an audio and video multiplexing unit for multiplexing the encoded video frames to be multiplexed by using the audio frames having the corrected jitter and the interpolated time stamps.

\* \* \* \* \*